United States Patent [19]
Mihara

[11] Patent Number: 5,671,080
[45] Date of Patent: Sep. 23, 1997

[54] OPTICAL SYSTEM SCANNING WITH A MIRROR FOR ELECTRONIC IMAGE PICKUP APPARATUS

[75] Inventor: Shinichi Mihara, Hino, Japan

[73] Assignee: Olympus Optical Co., Ltd., Tokyo, Japan

[21] Appl. No.: 360,432

[22] Filed: Dec. 21, 1994

[30] Foreign Application Priority Data

Dec. 22, 1993 [JP] Japan .................................. 5-345551
Mar. 18, 1994 [JP] Japan .................................. 6-049186

[51] Int. Cl.$^6$ .................................................. G02B 26/08
[52] U.S. Cl. ...................... 359/210; 359/212; 358/482; 358/483; 250/208.1; 250/234
[58] Field of Search ................................ 359/209, 210, 359/618, 629, 738, 739, 885, 891, 205, 212, 226, 823; 250/208.1, 234, 236, 201.2, 201.4; 358/482, 483; 348/202, 203

[56] References Cited

U.S. PATENT DOCUMENTS 5,173,796  12/1992  Palm et al. .......................... 359/210
5,434,429   7/1995  Dillen et al. ....................... 250/208.1

FOREIGN PATENT DOCUMENTS 61-188510  8/1986  Japan .
 5157962   6/1993  Japan .

*Primary Examiner*—James Phan
*Attorney, Agent, or Firm*—Cushman, Darby & Cushman IP Group of Pillsbury Madison & Sutro LLP

[57] ABSTRACT

An optical system comprising, in order from the object side, a rotating mirror which functions to deflect an optical axis for rays coming from an object point and scan fractions of an image, an aperture stop, an imaging lens system and electronic image pickup sensors. The optical system is configured to allow pickup of a high resolution image by using CCD's having a small number of picture elements.

7 Claims, 13 Drawing Sheets

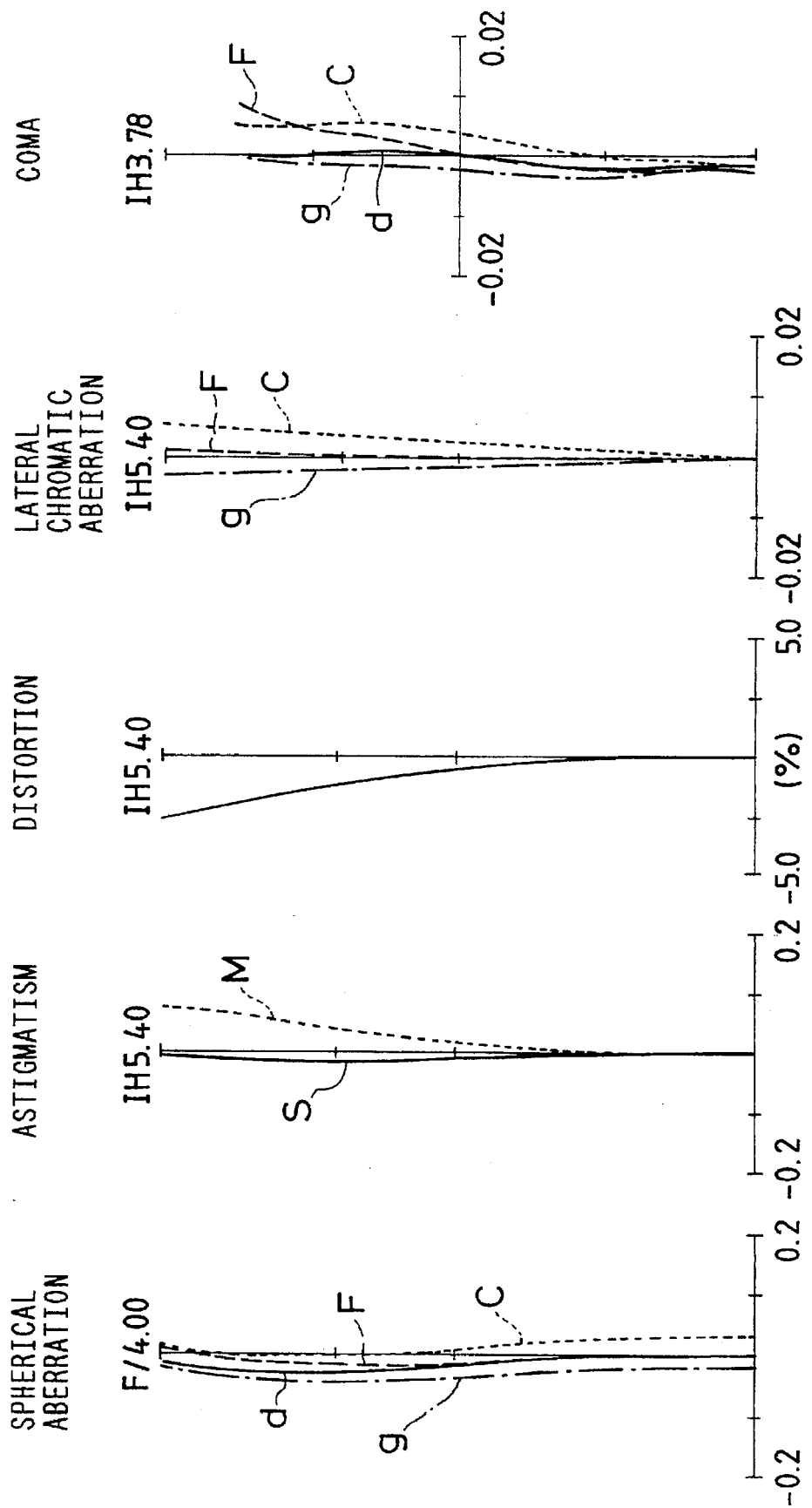

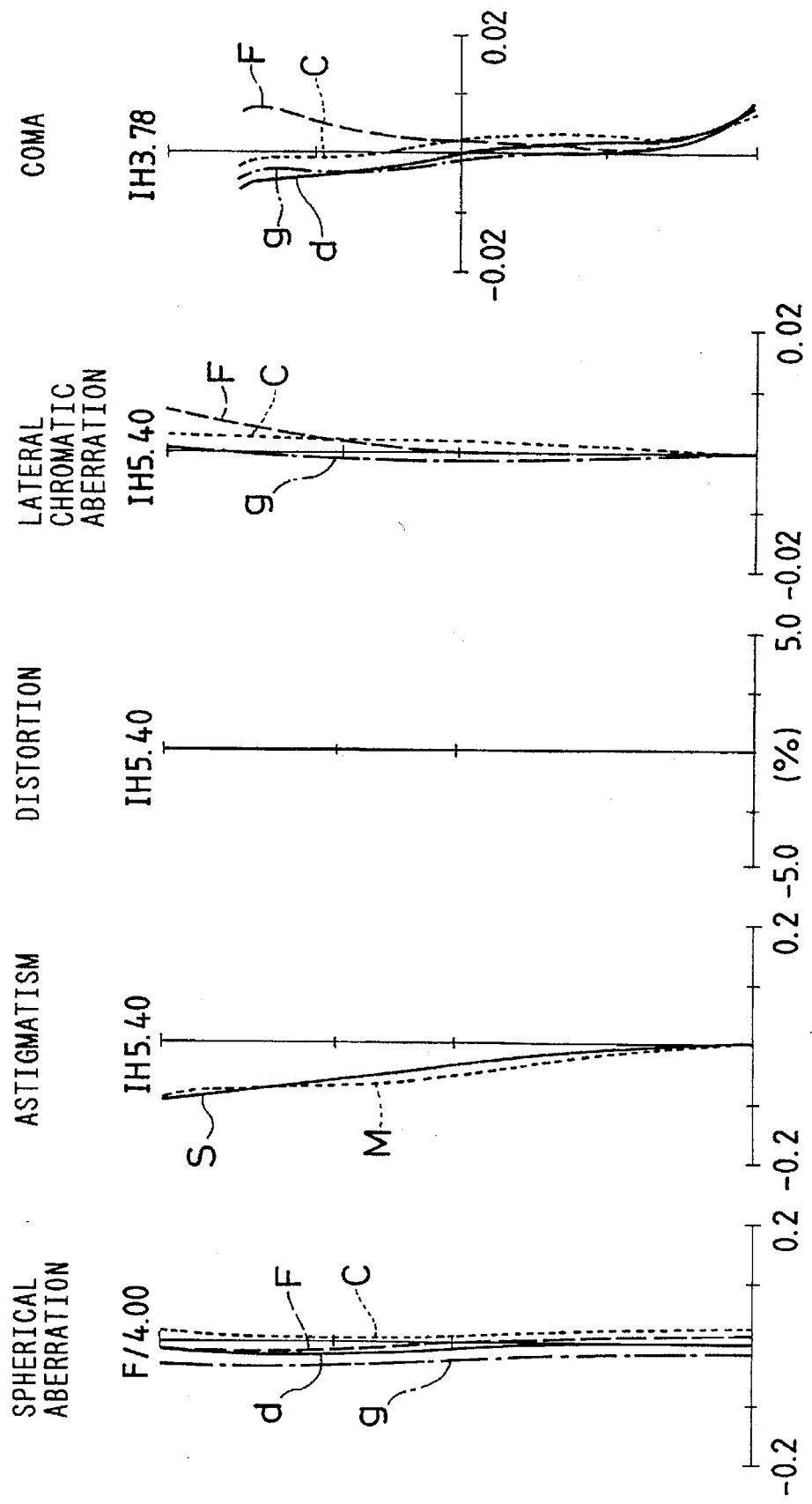

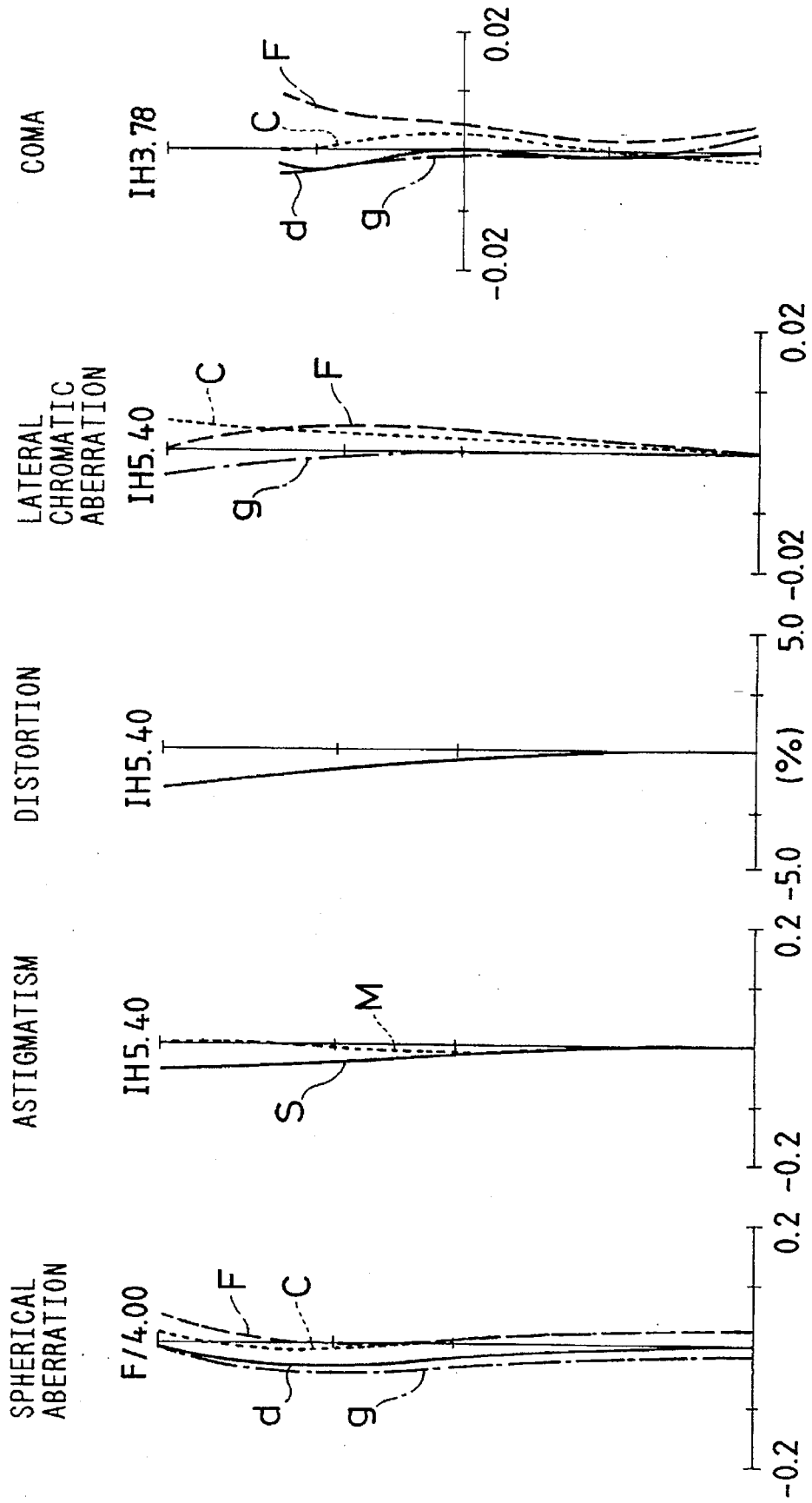

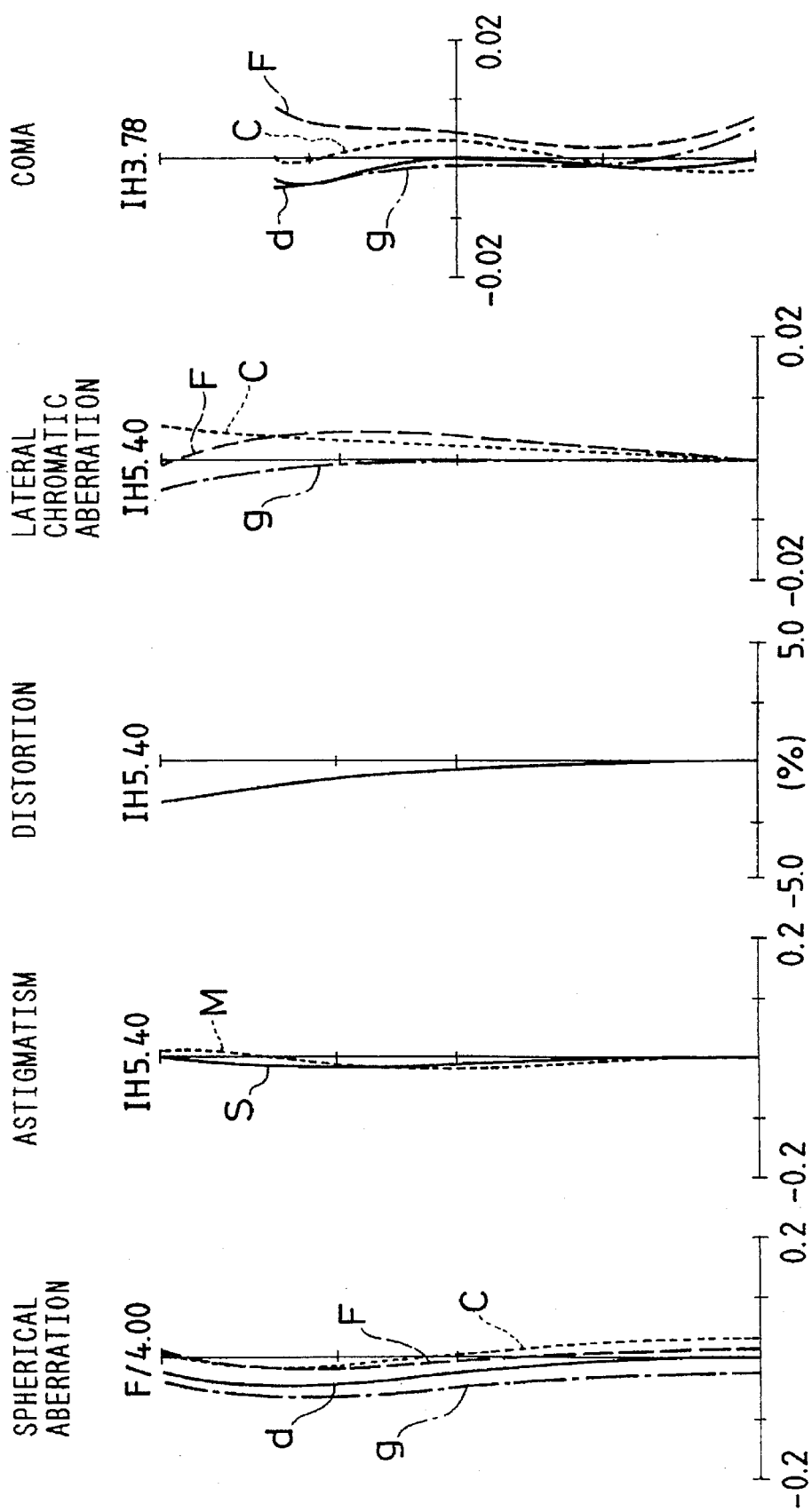

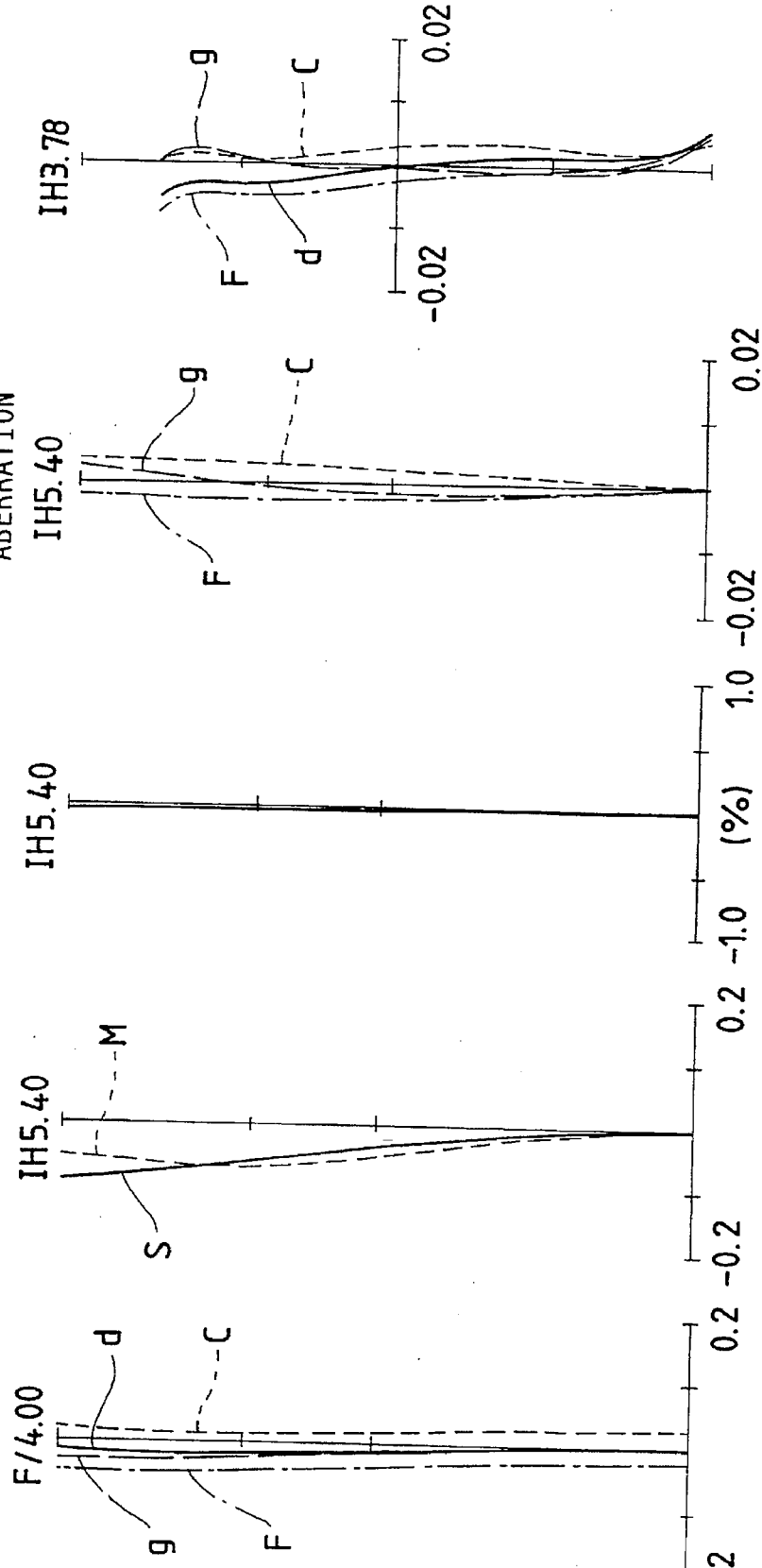

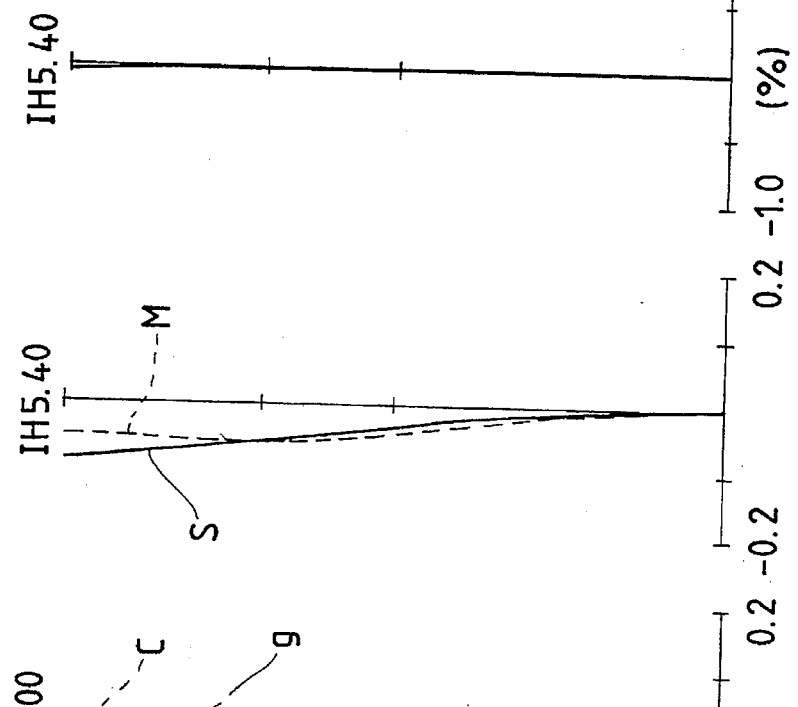
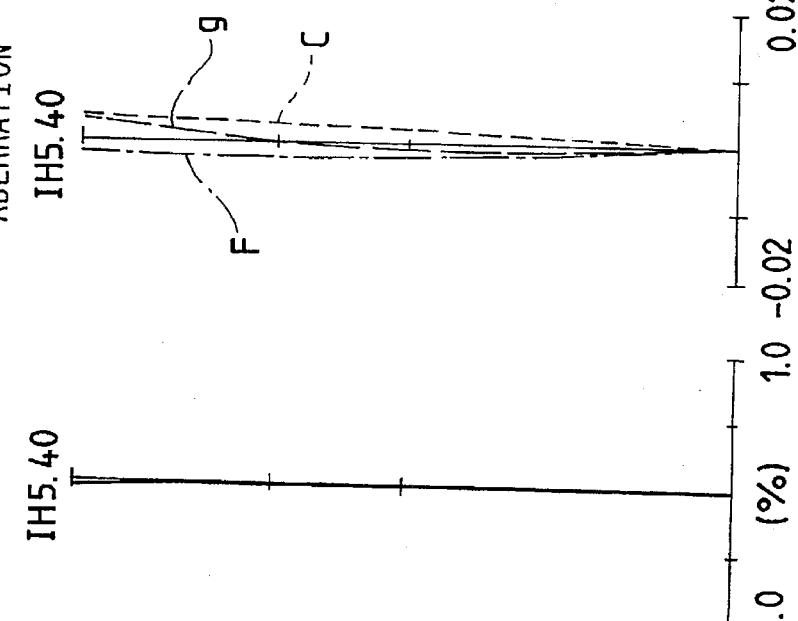
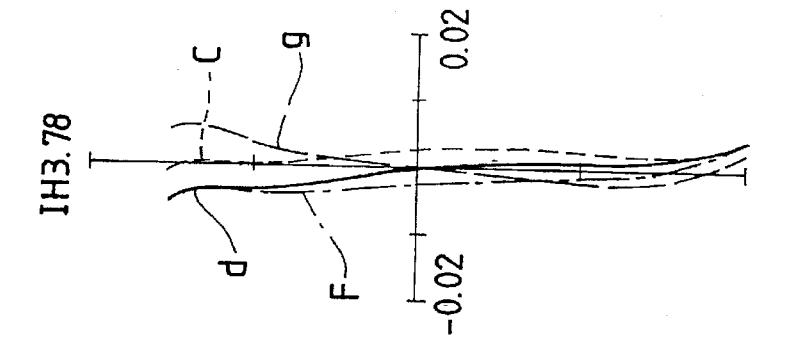

OPTICAL SYSTEM SCANNING WITH A MIRROR FOR ELECTRONIC IMAGE PICKUP APPARATUS

BACKGROUND OF THE INVENTION a) Field of the Invention

The present invention relates to an optical system for apparatus used for inputting extremely fine electronic images, and more specifically an optical system which performs scanning of an image with a mirror for electronic image pickup apparatus. Further, the present invention relates also to an imaging lens system which is to be used in the optical system for the electronic image pickup apparatus.

b) Description of the Prior Art

Electronic images, which can be processed in a variety of manners or modes, are now utilized not only as photographs but also as images to be input into computers. However, the conventional image pickup apparatus cannot provide images with a resolution as high as that of images photographed by silver salt cameras due to a fact that a small number of picture elements are disposed on each of the image sensors used in the electronic image pickup apparatus, and are therefor incapable of picking up characters, fine patterns and so on. Though it is conceivable to pick up images of such fine patters by using image sensors which are in compliance with the HDTV standard, such image sensors have large image pickup areas, thereby inevitably enlarging optical systems which adopt these image sensors and image pickup apparatus which use these optical systems in the end. Further, picture elements are disposed in numbers which are not sufficient even on the image sensors in compliance with the HDTV standard.

It is also conceivable to pickup images with line sensors. However, the line sensors pickup images at slow speeds and cannot pick up stereo-scopic images.

Furthermore, it is required that an imaging lens system which is to be used in such an optical system for image pickup apparatus composes a telecentric system on the side of emergence in the optical system. When an attempt is made to compose an imaging lens system which consists of a small number of lens elements and has a short total length, like a lens system having a single focal length, an aperture stop is inevitably disposed in front of the imaging lens system. Moreover, since it is necessary to dispose optical elements such as optical low pass filters between the imaging lens system and an image surface, the imaging lens system must have a back focal length which is longer than a focal length thereof.

As a conventional example of a lens systems which uses an aperture stop disposed in front of the lens systems, which comprise a telecentric lens systems on the side of emergence and which have long back focal lengths, there is known the lens system disclosed by Japanese Patent Kokai Publication No. Hei 5-157,962. However, this lens system produces barrel distortion which is undesirable for composing images at an image processing stage.

SUMMARY OF THE INVENTION

A primary object of the present invention is to provide an image pickup optical system with performs scanning with a rotating mirror for electronic image input apparatus to enable utilization of picture elements in a number substantially larger than that of picture elements disposed on an image sensor in compliance with the HDTV standard even by using an image sensor according to the NTSC, PAL or HDTV standard, thereby being capable of providing an image with resolution as high as those on photographs taken with silver salt cameras and making it possible to obtain a low-price electronic image input apparatus as comapct as conventional still cameras.

Another object of the present invention is to provide an imaging lens system which is suitable for use in an optical system which performs scanning with a rotating mirror, which uses an aperture stop disposed on the object side of the lens system, which produces distortion of approximately zero, and which has a long back focal length.

The optical system which performs scanning with a rotating mirror for electronic image pickup apparatus comprises, in order from the object side, a rotating mirror which functions to deflect an optical axis for rays coming from an object point and to perform scanning, an aperture stop, an imaging lens system which comprises lens elements movable along the optical axis or is movable as a whole along the optical axis, and electronic image sensors.

Further, the optical system for the electronic image pickup apparatus according to the present invention is characterized in that a half mirror which functions to branch an optical path into two; one in a direction for allowing reflected rays to travel along a deflected optical axis and the other in another direction for allowing transmitting rays along a non-deflected optical axis; is disposed between the imaging lens system and the image pickup sensors. Furthermore, the optical system for electronic the image pickup apparatus according to the present invention is also characterized in that the electronic image sensors are disposed so that longitudinal directions thereof are nearly coincident with directions perpendicular to a direction of rotation of the rotating mirror and that a direction of the optical axis deflected by the half mirror is in parallel with a plane including the direction of rotation of the rotating mirror.

Now, description will be made of the imaging lens system to be used in the optical system according to the present invention.

The imaging lens system to be used in the optical system according to the present invention is equipped with an aperture stop disposed in front of the lens system, and consists of a front lens unit and a rear lens unit which are disposed in order from the object side (the side of the aperture stop). The front lens unit consists, in order from the object side, of a first lens element having a positive refractive power and a second lens element having a negative refractive power, whereas the rear lens unit consists, in order from the object side (the side of the front lens unit), of a first lens element having a negative refractive power, a second lens element having a positive refractive power, a third lens element having a positive refractive power and a fourth negative meniscus lens element having a concave surface on the object side; the fourth lens element may or may not be disposed in the rear lens unit. The imaging lens system is configured so as to satisfy the following condition (1):

$$0.5 < f_R/f_F < 4.0 \tag{1}$$

wherein the reference symbol $f_F$ represents a total focal length of the front lens unit and the reference symbol $f_R$ designates a total focal length of the rear lens unit.

Further, the imaging lens system is configured so as to satisfy the following condition (2):

$$0.13 < D/f < 0.5 \tag{2}$$

wherein the reference symbol D represents an airspace reserved between the front lens unit and the rear lens unit, and the reference symbol f designates a focal length of the imaging lens system as a whole.

Furthermore, it is desirable that the imaging lens system satisfies the following condition (3):

$$0.2 < n_1 - n_2 < 0.43 \tag{3}$$

wherein the reference symbols $n_1$ and $n_2$ represent refractive indices of the first lens element and the second lens element respectively disposed in the front lens unit.

When the rear lens unit of the imaging lens system used in the optical system according to the present invention consists of the first through fourth lens elements, it is desirable that the imaging lens system satisfy the following condition (4):

$$5 < v_p - v_n < 50 \tag{4}$$

wherein the reference symbol $v_p$ represents an Abbe's number of the third lens element disposed in the rear lens unit and the reference symbol $v_n$ designates an Abbe's number of the fourth lens element disposed in the rear lens unit.

In the imaging lens system used in the optical system according to the present invention which consists of the front lens unit and the rear lens unit as described above, it is desirable that the rear lens unit is composed, in order from the object side (the side of the aperture stop), of a first negative lens element having high curvature on an object side surface thereof, a second positive lens element having high curvature on and image side surface thereof, a third positive lens element having high curvature on an image side surface thereof and a fourth negative meniscus lens element having a strongly concave surface on the object side, and configured so as to satisfy the following condition (5):

$$0.6 < R_{41}/R_{32} < 1.0 \tag{5}$$

wherein the reference symbol $R_{32}$ represents a radius of curvature on the image side surface of the third lens element disposed in the rear lens unit and the reference symbol $R_{41}$ designates a radius of curvature on the object side surface of the fourth lens element disposed in the rear lens unit.

Further, it is desirable that an airspace D reserved between the front lens unit and the rear lens unit satisfy the following condition (6):

$$0.12 < D/f < 0.25 \tag{6}$$

Furthermore, it is desirable to configure the rear lens unit of the imaging lens system satisfying the above-mentioned condition (5) so as to satisfy also at least one of the following conditions (7) through (10):

$$-1.3 < (R_{11}+R_{12})/(R_{11}-R_{12}) < -0.4 \tag{7}$$

$$0.25 < (R_{21}+R_{22})/(R_{21}-R_{22}) < 1.2 \tag{8}$$

$$0.4 < (R_{31}+R_{32})/(R_{31}-R_{32}) < 1.2 \tag{9}$$

$$-5.0 < (R_{41}+R_{42})/(R_{41}-R_{42}) < 0 \tag{10}$$

wherein the reference symbols $R_{11}$ and $R_{12}$ represent radii of curvature on an object side surface and an image side surface respectively of the first lens element disposed in the rear lens unit, the reference symbols $R_{21}$ and $R_{22}$ designate radii of curvature on an object side surface and an image side surface respectively of the second lens element disposed in the rear lens unit, the reference symbols $R_{31}$ and $R_{32}$ denote radii of curvature on an object side surface and an image side surface of the third lens element disposed in the rear lens unit, and the reference symbols $R_{41}$ and $R_{42}$ represent radii of curvature on an object side surface and an image side surface respectively disposed in the rear lens unit.

An imaging lens system which is configured so as to satisfy the condition (5) and the conditions (7) through (10) or an imaging lens system which is configured so as to satisfy the conditions (5) through (10) can accomplish the objects of the present invention.

Moreover, it is desirable to use, in the optical system according to the present invention, an imaging lens system which is configured so as to satisfy not only the conditions (5) and (6) but also the following conditions (11), (12) and (13):

$$1.45 < N_{R2} < 1.70 \tag{11}$$

$$1.45 < N_{R3} < 1.70 \tag{12}$$

$$1.70 < N_{R4} < 1.95 \tag{13}$$

wherein the reference symbols $N_{R2}$, $N_{R3}$ and $N_{R4}$ represent refractive indices of the second lens element, the third lens element and the fourth lens element respectively disposed in the rear lens unit.

It is also effective to use, in the optical system according to the present invention, an imaging lens system which is configured so as to satisfy not only the condition (5) and at least one of the conditions (7) through (10) but also the conditions (11) through (13).

When the imaging lens system to be used in the optical system according to the present invention is configured so as to satisfy the above-mentioned conditions (5) and others, it is desirable that the front lens unit consist of a first lens element having a positive refractive power and a second lens element having a negative refractive power, and be configured so as to satisfy the following conditions (14) and (15):

$$0.05 < N_{F1} - N_{F2} < 0.35 \tag{14}$$

$$-10 < v_{F1} - v_{F2} < 25 \tag{15}$$

wherein the reference symbols $N_{F1}$ and $N_{F2}$ represent refractive indices of the first lens element and the second lens element respectively disposed in the front lens unit, and the reference symbols $v_{F1}$ and $v_{F2}$ designate Abbe's numbers of the first lens element and the second lens element respectively disposed in the front lens unit.

In addition, it is desirable that the first lens element and the second lens element disposed in the front lens unit satisfy the following condition (16):

$$0.9 < R_{F21}/R_{F12} < 1.6 \tag{16}$$

wherein the reference symbol $R_{F12}$ represents a radius of curvature on an image side surface of the first lens element disposed in the front lens unit and the reference symbol $R_{F21}$ designates a radius of curvature on an object side surface of the second lens element disposed in the front lens unit.

BRIEF DESCRIPTION OF THE DRAWINGS

FIG. 11A, FIG. 11B, FIG. 11C, FIG. 11D and FIG. 11E show graphs illustrating aberration characteristics of the first embodiment of the imaging lens system used in the optical system according to the present invention;

FIG. 12A, FIG. 12B, FIG. 12C, FIG. 12D and FIG. 12E show graphs illustrating aberration characteristics of the second embodiment of the imaging lens system used in the optical system according to the present invention;

FIG. 13A, FIG. 13B, FIG. 13C, FIG. 13D and FIG. 13E show graphs illustrating aberration characteristics of the third embodiment of the imaging lens system used in the optical system according to the present invention;

FIG. 14A, FIG. 14B, FIG. 14C, FIG. 14D and FIG. 14E show curves visualizing aberration characteristics of the fourth embodiment of the imaging lens system used in the optical system according to the present invention;

FIG. 15A, FIG. 15B, FIG. 15C, FIG. 15D and FIG. 15E show curves visualizing aberration characteristics of the fifth embodiment of the imaging lens system used in the optical system according to the present invention;

FIG. 17A, FIG. 17B, FIG. 17C, FIG. 17D and FIG. 17E show graphs illustrating aberration characteristics of the seventh embodiment of the imaging lens system used in the optical system according to the present invention.

DETAILED DESCRIPTION OF THE PREFERRED EMBODIMENTS

Figure 1:
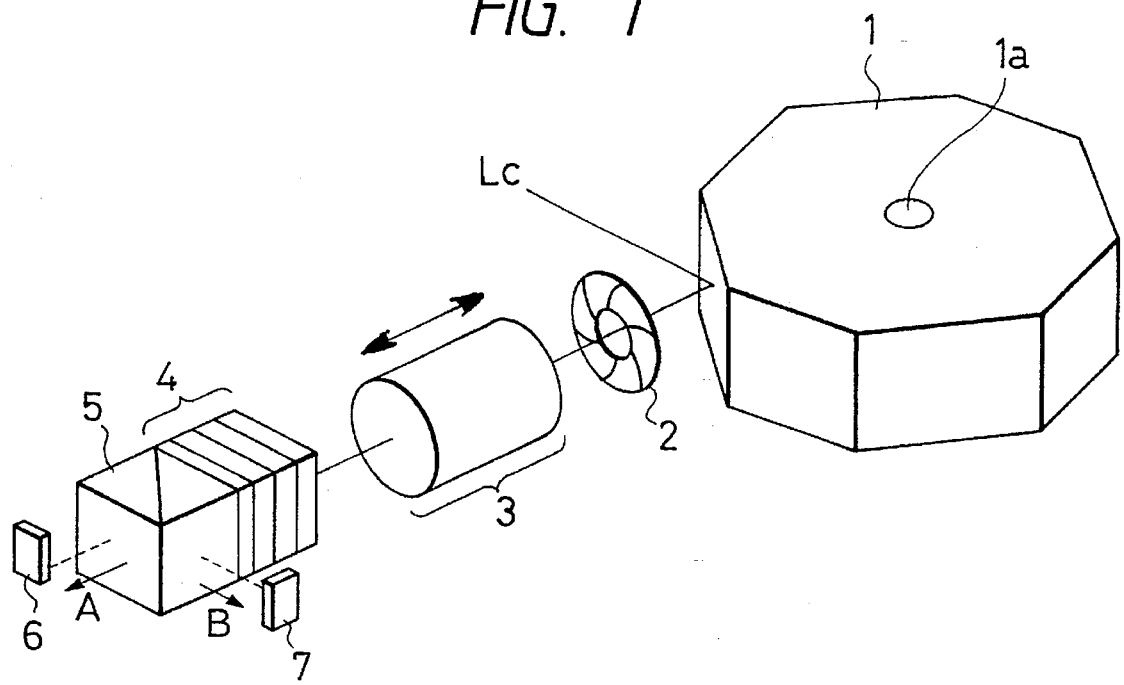
FIG. 1 shows a perspective view illustrating a configuration of the optical system according to the present invention.

The optical system according to the present invention has a configuration illustrated in FIG. 1, or comprises, in order from the object side, a rotating mirror 1 for deflecting an optical axis $L_c$ for rays coming from an object point, an aperture stop 2, an imaging lens system 3 which comprises lens components movable along the optical axis $L_c$ or is movable as a whole along the optical axis $L_c$, and optical low pass filters 4 which utilize a birefringence of a crystal, a half mirror 5 for branching an optical path in two directions: a direction A in which the deflected optical axis is located and another direction B in which rays are to be allowed to travel after transmission therethrough, and electronic image pickup devices 6 and 7 disposed at positions conjugate with each other in the optical paths branched by the half mirror 5.

The optical system according to the present invention is an image pickup optical system which comprises the two-dimentional image pickup sensors 6, 7 each having a small number of picture elements and a small image pickup area, the imaging lens system 3 matched in performance thereof with these image pickup sensors 6, 7 and the rotating mirror 5; and functions to divide an object having a large angle of view into several regions, to pick up a plurality of images corresponding to the divided regions by turning the rotating mirror 5 and to compose the plurality of images into an image through image processing, thereby providing a complete image of the object.

As is understood from the foregoing description, the optical system according to the present invention can be configured to be compact since it permits using low-price image pickup sensors and reducing a size of an image circle required for picking up an image.

Due to the fact that the optical system according to the present invention is configured so as to pick up divided fractions of an image and then compose the fractions into an original image, the optical system according to the present invention involves the problems which are mentioned below:

(1) A composed image is deformed since individual divided fractions of the image have different tilting angles at the stage to pickup the divided fractions of the image. Further, an object, even if it has a planar surface, cannot be brought into focus over the entire range of an image surface since a distance as measured from the imaging lens sysem to the object is slightly varied by the rotation of the mirror.

(2) Composition of the divided fractions of the image is made impossible due to distortion produced by the imaging lens system.

(3) Composition of the divided fractions of the image is made impossible by parallax produced on portions which are in contact with each other on adjacent divided fractions of the image.

Out of the problems mentioned above, (1) and (2) which are related to deformation or distortion can be solved by converting video signals into digital signals, performing electrical processing such as conversion of a coordinates system, etc. and composing the divided fractions after the electrical processes. Further, out of defocused conditions due to the difference in the tilting angles, defocus over the entire range of the image surface is slight and can be corrected by selecting specifications of the optical system so that the defocus is within a depth of focus of the optical system. Furthermore, the variation of an object distance caused due to the rotation of the mirror can be corrected by adjusting a focused condition for each rotation of the mirror, but the correction of the deviation of the object distance requires modification of the optical system since a size of the image is varied by focusing. However, such correction is made unnecessary by configuring the optical system so as to allow a principal ray to emerge therefrom nearly in parallel with the optical axis on the image side since the defocus condition is to be adjusted only in a small amount.

The parallax mentioned in item (3) above cannot be corrected electrically and the problem (3) must be solved by selecting an adequate configuration for the optical system.

The optical system according to the present invention, which scans an object whose image is to be picked up consists of the rotating mirror 1 which functions to deflect the optical axis $L_c$ for the rays coming from the object point and to scan the object, the imaging lens system 3 which is disposed subsequently to the rotating mirror and equipped with an aperture stop 2 disposed on the object side thereof, and the aperture stop 2 which is disposed on the object side (the side of the rotating mirror) of the imaging lens system. This optical system has such a configuration as to allow a rotating shaft 1a of the rotating mirror 1 and an entrance pupil of the imaging lens system to be disposed at locations which are as close as possible to each other. This configuration makes it possible to correct the above-mentioned parallax to a level at which the above-mentioned parallax produces no substantial influence on practical use of the optical system.

When the rotating mirror 1 is rotated in a limited one direction in the optical system according to the present invention illustrated in FIG. 1, an image having a large field angle can be obtained in the direction of rotation thereof, but an image having only a small field angle is available in a direction perpendicular to the direction of rotation.

Figure 2A:
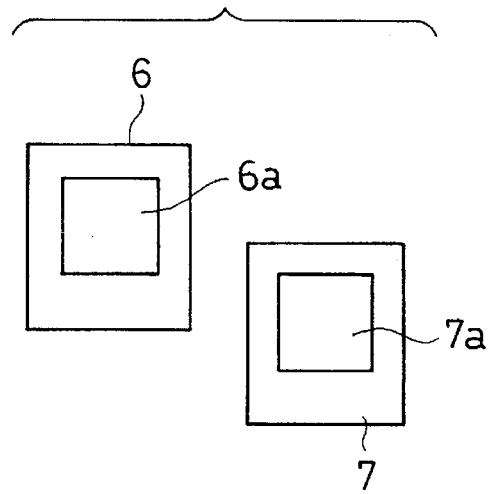
FIG. 2A and FIG. 2B illustrate a configuration of CCD's to be used in the optical system according to the present invention.

In the optical system according to the present invention, two electronic image sensors 6, 7 (hereinafter referred to as CCD's) are disposed on the same plane which is set in a direction perpendicular to the direction of rotation of the rotating mirror. When the CCD's 6, 7 are disposed at locations deviated from each other in a vertical direction (the direction perpendicular to the direction of rotation of the rotating mirror) on the same plane, however, it is impossible to compose effective fractions of an image. That is to say, when CCD's 6 and CCD's 7 are disposed at locations which are diviated from each other on the same plane as illustrated in FIG. 2A, light-receiving areas 6a of the CCD's 6 are not joined to light-receiving areas 7a of the CCD's 7.

Figure 2B:
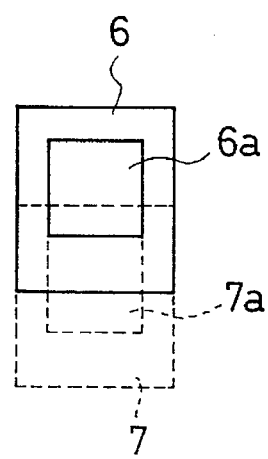

For this reason, the half mirror 5 for branching the optical path is disposed between the imaging lens system 3 of the optical system according to the present invention and an imaging point thereof, and the CCD's 6 and CCD's 7 are disposed at locations conjugate with each other on the optical axes branched in two directions A and B by the half mirror, whereby the optical system is capable of providing an image having a large field angle also in the direction perpendicular to the direction of rotation of the rotating mirror 3 so that a composed image has an aspect ratio of good balance. The CCD's 6 are deviated vertically from the optical axis indicated by an arrow A (traced in a dashed line) and the CCD's 7 are deviated vertically from the optical axis indicated by an arrow B (traced in another dashed line) so that the CCD's 6 and the CCD's 7 are set in positional relationship in the vertical direction as shown in FIG. 2B. Accordingly, the optical system according to the present invention is capable of joining an image obtained with the CCD's 6 to another image obtained with the CCD's 7, thereby being capable to providing an image which is the same as an image obtained with a light receiving area which is vertically elongated.

A CCD ordinary has a rectangular effective image pickup surface. In such an optical system as that shown in FIG. 1, it is desirable to coincide a longitudinal direction of an effective image pickup surface of the CCD with the direction of rotation of the rotating mirror in which an image is divided into fractions of a smaller number. Further, it is desirable to deflect the optical axis by the half mirror 5 in a direction which is in parallel with a plane including the direction of rotation of the rotating mirror 1 (a plane perpendicular to the rotating shaft 1a of the rotating mirror) so that the mirror 1 will occupy a narrow space in a direction along the optical axis or be used with a high efficiency.

Furthermore, optical low pass filters which are required for preventing an area swing from being caused due to use of the CCD are ordinarily interposed between an imaging lens system and the CCD.

In case of the optical system according to the present invention in which the half mirror 5 is disposed on the image side of the imaging lens system 3, filters 4 and the half mirror 5 can be disposed as a set when these filters are interposed on the object side of the half mirror 5.

Moreover, the above-mentioned filters and the half mirror have a function which produces an influence on a ratio at which a light amount is to be divided by the half mirror 5. It is therefore necessary that one of the optical low pass filters which is disposed at a location closest to the half mirror 5 is positioned so that the azimuth of an orthophotographic image of a crystallographic axis thereof formed by the imaging lens system 3 is set at 45° relative to the plane including the direction of rotation of the rotating mirror 1.

Now, description will be made of the preferred embodiments of the imaging lens system to be used in the optical system according to the present invention.

Figure 3A:
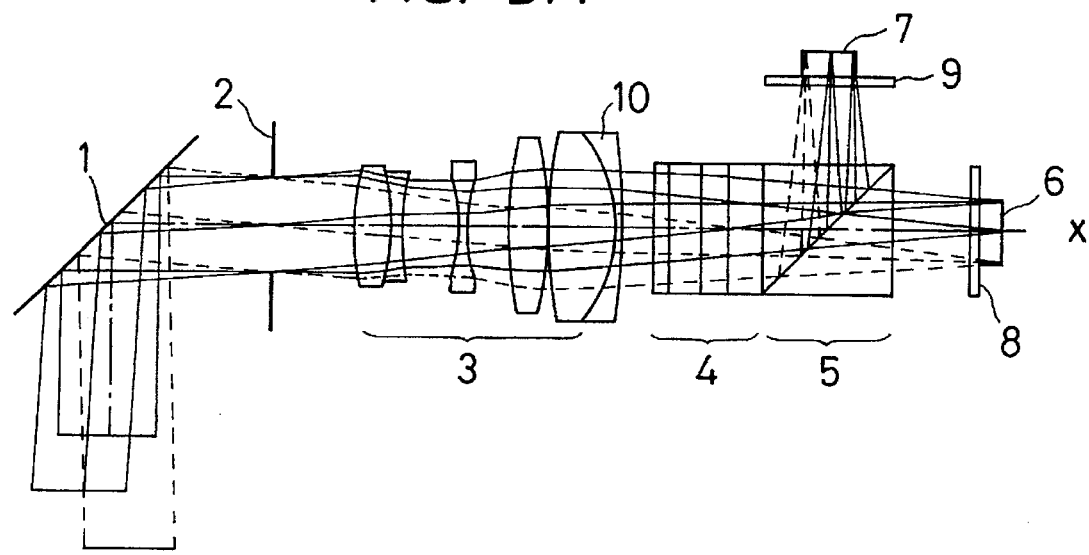
FIG. 3A and FIG. 3B show sectional views illustrating a composition of a first embodiment of an imaging lens system used in the optical system according to the present invention.
Figure 3B:
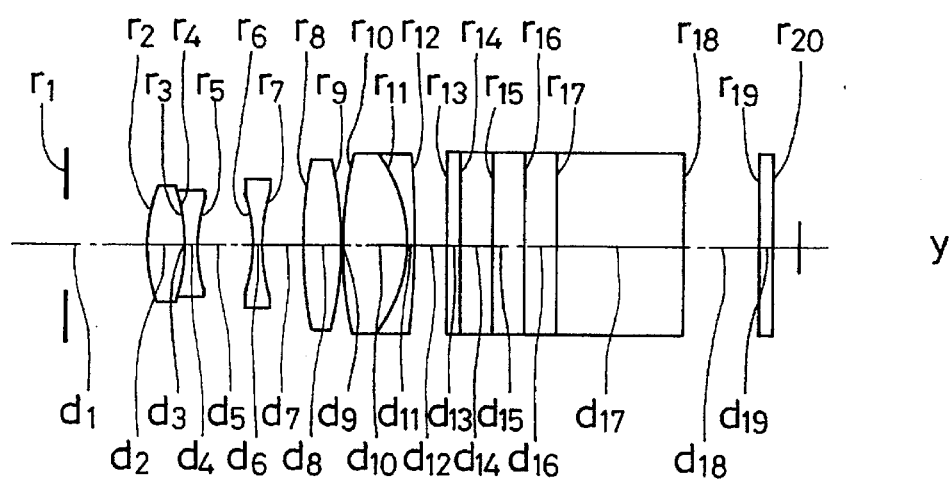

FIG. 3A and FIG. 3B show sectional views illustrating a composition of a first embodiment of the imaging lens system to be used in the optical system according to the present invention: FIG. 3A being a sectional view taken on a plane which is in parallel with the direction of rotation of the rotating mirror 1 and includes the optical axis; and FIG. 3B being a sectional view taken on a plane which is perpendicular to the plane in parallel with the direction of rotation of the rotating mirror 1 and includes the optical axis. In other words, FIG. 3A shows a sectional view taken in the x direction in FIG. 4, whereas FIG. 3B shows a sectional view taken in the y direction in FIG. 4.

A first embodiment of the imaging lens system to be used in the optical system according to the present invention consists of a front lens unit ($r_2$ through $r_5$) and a rear lens unit ($r_6$ through $r_{12}$) as illustrated in FIG. 3A and FIG. 3B: the front lens unit being composed of a first lens element having a positive refractive power and a second lens element having a negative refractive power; whereas the rear lens unit being composed of a first lens element having a negative refractive power, a second lens element having a positive refractive power, a third lens element having a positive refractive power and a fourth lens element having a negative refractive power.

Figure 4:
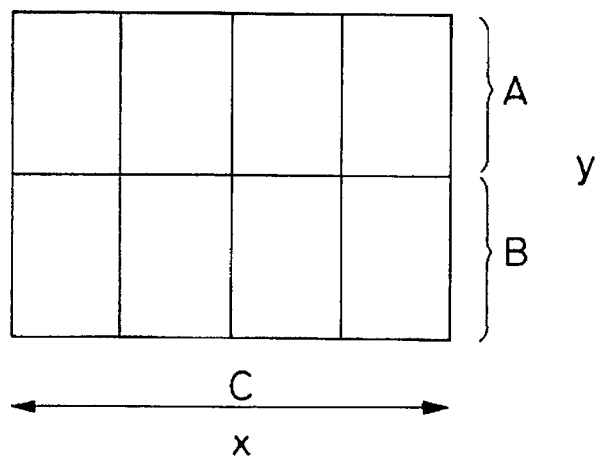
FIG. 4 shows a diagram illustrating a configuration of CCD's used in the optical system according to the present invention.

In the imaging lens system preferred as the first embodiment, an optical path is branched by a half mirror 5 into two paths which are directed toward CCD's 6 and CCD's 7 respectively as shown in FIG. 3A. Further, an image formed by the imaging lens system is divided and fractions of the image are picked up by the CCD's. Speaking concretely, upper fractions of the image are allowed to transmit through the half mirror 5 and be picked up by the CCD's 6, whereas lower fractions of the image are reflected by the half mirror 5 and picked up by the CCD's 7. Furthermore, the rotating mirror 1 rotates for scanning the object in the x direction, whereby the CCD's 6 and the CCD's 7 pickup the image as the fractions which are divided as shown in FIG. 4.

The imaging lens system preferred as the first embodiment of the imaging lens system comprises the lens elements having the positive refractive powers on the image side therein, i.e., the second lens element and the thrid lens element disposed in the rear lens unit, so that the lens system has a nearly telecentric composition. Accordingly, rays emerging from the imaging lens system are incident on the CCD's nearly perpendicularly to the image pickup surface thereof so as to reduce a variation in size of the image to be caused by focusing the lens system.

Moreover, it is necessary to electrically correct the deformation at the stage to join the fractions of the image picked up by the CCD's 6 and 7 when the imaging lens system produces distortion.

In the first embodiment, the fourth lens element disposed in the rear lens unit is configured as a negative meniscus lens element having a concave surface on the object side so as to suppress production of distortion to a level as low as possible. From a viewpoint of balance among the refractive powers of the lens elements, it is desirable to configure the first lens element through the third lens element disposed in the rear lens unit so as to have a total refractive power which is strongly positive.

In addition, it is necessary to configure the imaging lens system so as to have a long back focal length for disposing optical members such as the optical low pass filters 4 and the half mirror 5 on the image side of the imaging lens system. It is therefore desirable for the imaging lens system to satisfy the above-mentioned condition (1). The first embodiment of the imaging lens system for the optical system according to the present invention is configured so as to satisfy the condition (1).

If the upper limit of the condition (1) is exceeded, it will be difficult to configure the imaging lens system so as to have a long back focal length. If the lower limit of the condition (1) is exceeded, in contrast, the imaging lens system is apt to produce coma and barrel distortion. It is impossible to electrically correct too remarkable a distortion.

The first embodiment also satisfies the condition (2). If the upper limit of the condition (2) is exceeded, the imaging lens system will have a long total length. If the lower limit of the condition (2) is exceeded, in contrast, the rear lens unit will have too strong a refractive power, thereby being incapable of correcting spherical aberration and coma sufficiently.

Since the imaging lens system to be used in the optical system according to the present invention is used for obtaining a highly fine image, it is required for the lens system to form an image with high qualities even at marginal portions of an image surface. The imaging lens systems used in the conventional image pickup apparatus have a common defect in that they allow curvature of field (Petzval's sums) to be aggravated. The imaging lens system for the optical system according to the present invention can reduce a Petzval's sum since it is configured so as to satisfy the above-mentioned condition (3).

If $(n_1-n_2)$ has a value exceeding the lower limit of 0.2 of the condition (3), it will be impossible to reduce a Petzval's sum sufficiently. If the upper limit of 0.43 of the condition (3) is exceeded, in contrast, spherical aberration will tend to have components of high orders, thereby lowering contrast on an image.

Further, if the rear lens unit which is disposed far from the aperture stop has too strong a refractive power, it will be difficult to correct lateral chromatic aberration which is produced by the rear lens unit.

In the first embodiment, lateral chromatic aberration is corrected by configuring the fourth negative meniscus lens element disposed in the rear lens unit so as to have an Abbe's number satisfying the above-mentioned condition (4). If $(v_p-v_n)$ does not satisfy the condition (4), lateral chromatic aberration will tend to be under-corrected.

The first embodiment of the imaging lens system to be used in the optical system according to the present invention has the numerical data which are listed below:

EMBODIMENT 1

$f_R/f_F = 0.6702$, $D/f = 0.1476$,
$n_1 - n_2 = 0.23178$, $v_p - v_n = 25.40$

| | | | |
|---|---|---|---|
| $r_1 = \infty$ (stop) | $d_1 = 5.3000$ | | |
| $r_2 = 10.7547$ | $d_2 = 2.3500$ | $n_1 = 1.77250$ | $v_1 = 49.66$ |
| $r_3 = -24.4181$ | $d_3 = 0.0800$ | | |
| $r_4 = -18.3665$ | $d_4 = 0.8000$ | $n_2 = 1.54072$ | $v_2 = 47.20$ |
| $r_5 = 9.1058$ | $d_5 = 3.5431$ | | |
| $r_6 = -20.2918$ | $d_6 = 0.8000$ | $n_3 = 1.54814$ | $v_3 = 45.78$ |
| $r_7 = 14.1893$ | $d_7 = 2.6210$ | | |
| $r_8 = 29.8342$ | $d_8 = 2.3500$ | $n_4 = 1.69680$ | $v_4 = 55.52$ |
| $r_9 = -29.8342$ | $d_9 = 0.1500$ | | |
| $r_{10} = 31.5186$ | $d_{10} = 3.6500$ | $n_5 = 1.69680$ | $v_5 = 55.52$ |
| $r_{11} = -11.6000$ | $d_{11} = 1.0000$ | $n_6 = 1.69895$ | $v_6 = 30.12$ |
| $r_{12} = -49.9851$ | $d_{12} = 2.0000$ | | |
| $r_{13} = \infty$ | $d_{13} = 0.7700$ | $n_7 = 1.54771$ | $v_7 = 62.83$ |
| $r_{14} = \infty$ | $d_{14} = 2.1000$ | $n_8 = 1.52420$ | $v_8 = 70.20$ |
| $r_{15} = \infty$ | $d_{15} = 1.8600$ | $n_9 = 1.54771$ | $v_9 = 62.83$ |
| $r_{16} = \infty$ | $d_{16} = 2.0000$ | $n_{10} = 1.54771$ | $v_{10} = 62.83$ |
| $r_{17} = \infty$ | $d_{17} = 8.0000$ | $n_{11} = 1.51633$ | $v_{11} = 64.15$ |
| $r_{18} = \infty$ | $d_{18} = 5.0000$ | | |
| $r_{19} = \infty$ | $d_{19} = 0.7500$ | $n_{12} = 1.48749$ | $v_{12} = 70.20$ |
| $r_{20} = \infty$ | | | |

Figure 5A:
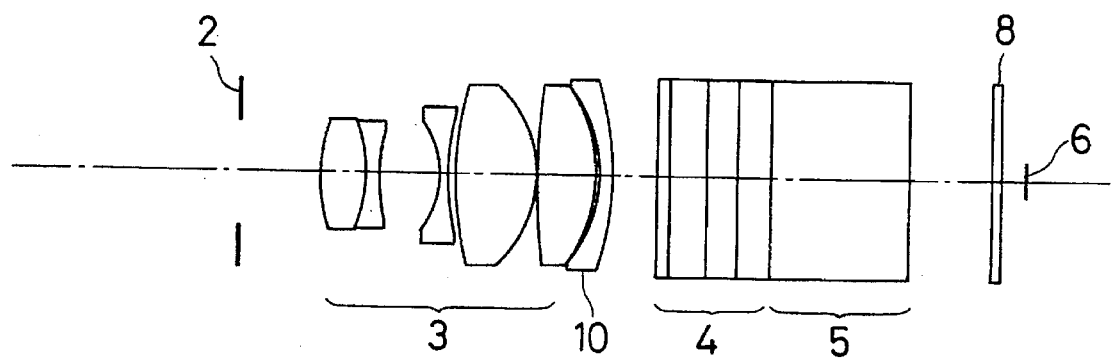
FIG. 5A and FIG. 5B show sectional views illustrating a composition of a second embodiment of the imaging lens system used in the optical system according to the present invention.
Figure 5B:
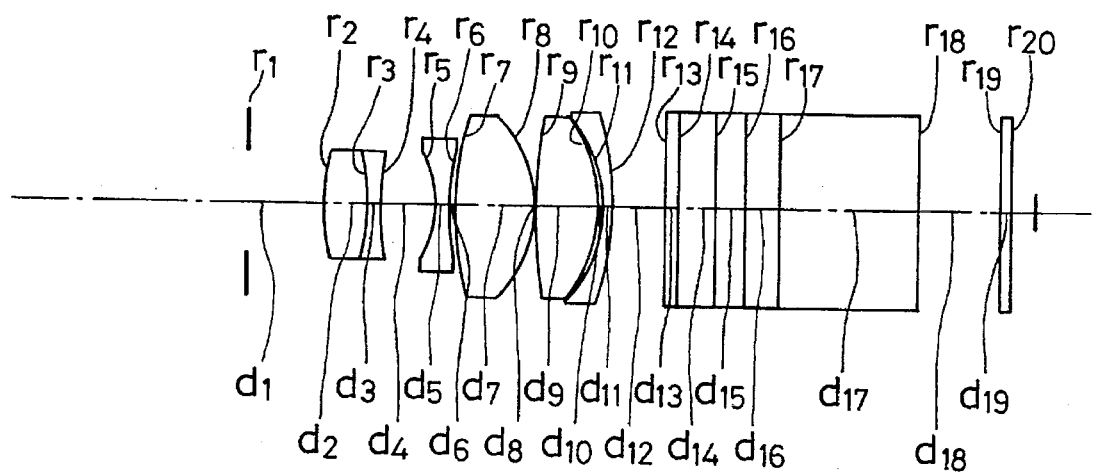

A second embodiment of the imaging lens system to be used in the optical system according to the present invention has a composition illustrated in FIG. 5A and FIG. 5B. The second embodiment has a composition similar to that of the first embodiment and the numerical data listed below:

EMBODIMENT 2

$f_R/f_F = 2.518$, $D/f = 0.1473$,
$n_1 - n_2 = 0.25544$, $v_p - v_n = 10.09$

| | | | |
|---|---|---|---|
| $r_1 = \infty$ (stop) | $d_1 = 5.3000$ | | |
| $r_2 = 11.6527$ | $d_2 = 2.6000$ | $n_1 = 1.78800$ | $v_1 = 47.38$ |
| $r_3 = -11.6527$ | $d_3 = 0.8000$ | $n_2 = 1.53256$ | $v_2 = 45.91$ |
| $r_4 = 11.6527$ | $d_4 = 3.5349$ | | |
| $r_5 = -5.7149$ | $d_5 = 0.8000$ | $n_3 = 1.83400$ | $v_3 = 37.16$ |
| $r_6 = 30.9492$ | $d_6 = 0.3020$ | | |
| $r_7 = 19.7222$ | $d_7 = 4.6000$ | $n_4 = 1.60311$ | $v_4 = 60.70$ |

-continued $f_R/f_F = 2.518$, D/f = 0.1473,
$n_1 - n_2 = 0.25544$, $v_p - v_n = 10.09$

| | | | |
|---|---|---|---|
| $r_8 = -7.6167$ | | | |
| | $d_8 = 0.1500$ | | |
| $r_9 = 57.8307$ | | | |
| | $d_9 = 3.1000$ | $n_5 = 1.67003$ | $v_5 = 47.25$ |
| $r_{10} = -10.7252$ | | | |
| | $d_{10} = 0.4200$ | | |
| $r_{11} = -8.5095$ | | | |
| | $d_{11} = 0.9000$ | $n_6 = 1.83400$ | $v_6 = 37.16$ |
| $r_{12} = -17.5084$ | | | |
| | $d_{12} = 2.0000$ | | |
| $r_{13} = \infty$ | | | |
| | $d_{13} = 0.7700$ | $n_7 = 1.54771$ | $v_7 = 62.83$ |
| $r_{14} = \infty$ | | | |
| | $d_{14} = 2.1000$ | $n_8 = 1.52420$ | $v_8 = 70.20$ |
| $r_{15} = \infty$ | | | |
| | $d_{15} = 1.8600$ | $n_9 = 1.54771$ | $v_9 = 62.83$ |
| $r_{16} = \infty$ | | | |
| | $d_{16} = 2.0000$ | $n_{10} = 1.54771$ | $v_{10} = 62.83$ |
| $r_{17} = \infty$ | | | |
| | $d_{17} = 8.0000$ | $n_{11} = 1.51633$ | $v_{11} = 64.15$ |
| $r_{18} = \infty$ | | | |
| | $d_{18} = 5.0000$ | | |
| $r_{19} = \infty$ | | | |
| | $d_{19} = 0.7500$ | $n_{12} = 1.48749$ | $v_{12} = 70.20$ |
| $r_{20} = \infty$ | | | |

Figure 6A:
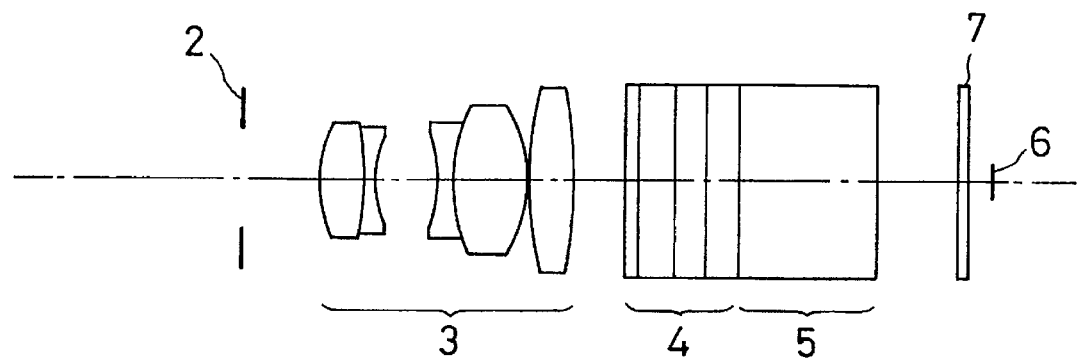
FIG. 6A and FIG. 6B show sectional views illustrating a composition of a third embodiment of the imaging lens system used in the optical system according to the present invention.
Figure 6B:
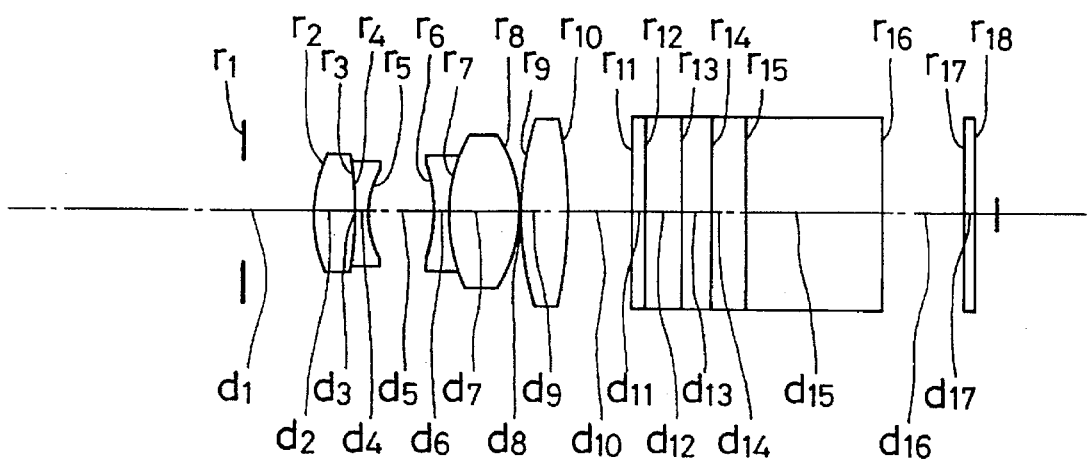

A third embodiment of the imaging lens system to be used in the optical system according to the present invention has a composition shown in FIG. 6A and FIG. 6B. A rear lens unit used in this embodiment does not comprise a fourth lens element; rather, it consists of a first lens element, a second lens element and a third lens element.

The third embodiment is configured so as to satisfy the conditions (1), (2) and (3), and has the following numerical data:

EMBODIMENT 3

$f_R/f_F = 1.710$, D/f = 0.1584,
$n_1 - n_2 = 0.32027$

| | | | |
|---|---|---|---|
| $r_1 = \infty$ (stop) | | | |
| | $d_1 = 5.3000$ | | |
| $r_2 = 9.0705$ | | | |
| | $d_2 = 2.6000$ | $n_1 = 1.83481$ | $v_1 = 42.72$ |
| $r_3 = -25.9001$ | | | |
| | $d_3 = 0.0300$ | | |
| $r_4 = -22.0543$ | | | |
| | $d_4 = 0.8000$ | $n_2 = 1.51454$ | $v_2 = 54.69$ |
| $r_5 = 7.3023$ | | | |
| | $d_5 = 3.8005$ | | |
| $r_6 = -07.4362$ | | | |
| | $d_6 = 0.8000$ | $n_3 = 1.84666$ | $v_3 = 23.78$ |
| $r_7 = 11.5559$ | | | |
| | $d_7 = 4.2000$ | $n_4 = 1.51454$ | $v_4 = 54.69$ |
| $r_8 = -9.1593$ | | | |
| | $d_8 = 0.1500$ | | |
| $r_9 = 21.2403$ | | | |
| | $d_9 = 2.7500$ | $n_5 = 1.68893$ | $v_5 = 31.08$ |
| $r_{10} = -25.4015$ | | | |
| | $d_{10} = 2.0000$ | | |
| $r_{11} = \infty$ | | | |
| | $d_{11} = 0.7700$ | $n_6 = 1.54771$ | $v_6 = 62.83$ |
| $r_{12} = \infty$ | | | |
| | $d_{12} = 2.1000$ | $n_7 = 1.52420$ | $v_7 = 70.20$ |
| $r_{13} = \infty$ | | | |
| | $d_{13} = 1.8600$ | $n_8 = 1.54771$ | $v_8 = 62.83$ |
| $r_{14} = \infty$ | | | |
| | $d_{14} = 2.0000$ | $n_9 = 1.54771$ | $v_9 = 62.83$ |
| $r_{15} = \infty$ | | | |
| | $d_{15} = 8.0000$ | $n_{10} = 1.51633$ | $v_{10} = 64.15$ |

-continued $f_R/f_F = 1.710$, D/f = 0.1584,
$n_1 - n_2 = 0.32027$

| | | | |
|---|---|---|---|
| $r_{16} = \infty$ | | | |
| | $d_{16} = 5.0000$ | | |
| $r_{17} = \infty$ | | | |
| | $d_{17} = 0.7500$ | $n_{11} = 1.48749$ | $v_{11} = 70.20$ |
| $r_{18} = \infty$ | | | |

Figure 7A:
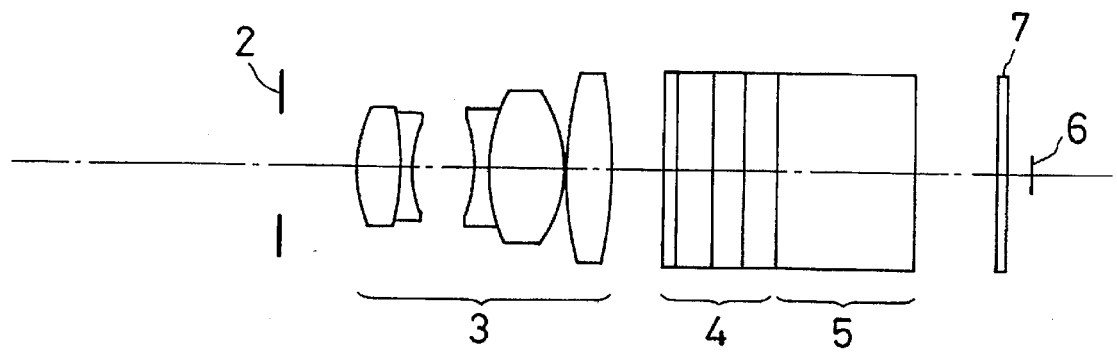
FIG. 7A and FIG. 7B show sectional views illustrating a composition of a fourth embodiment of the imaging lens system used in the optical system according to the present invention.
Figure 7B:
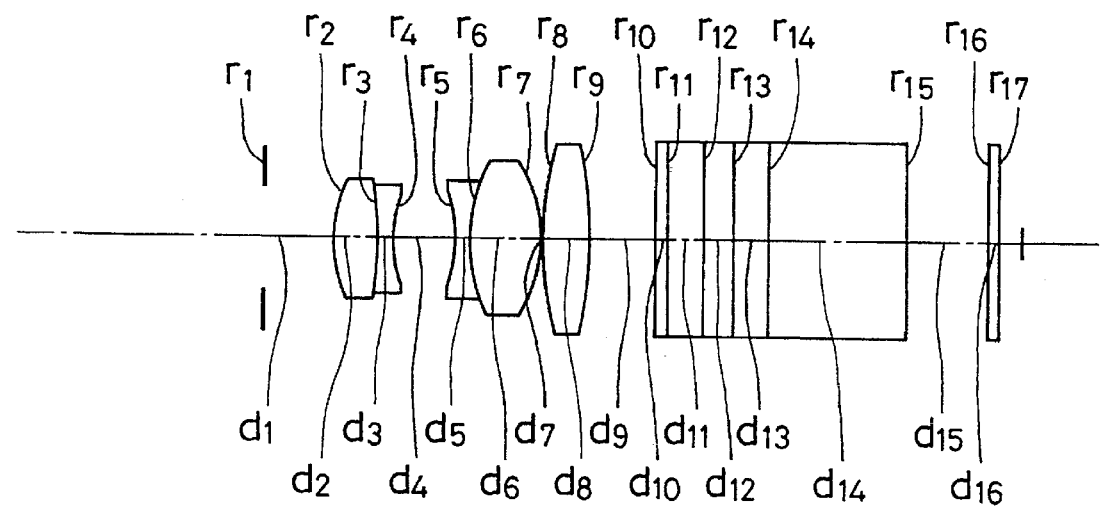

A fourth embodiment of the imaging lens system to be used in the optical system according to the present invention has a composition shown in FIG. 7A and FIG. 7B, and adopts a rear lens unit which consists, like that of the third embodiment, of a first lens element, a second lens element and a third lens element. The fourth embodiment is configured so as to satisfy the conditions (1), (2) and (3), and has the numerical data listed below:

EMBODIMENT 4

$f_R/f_F = 2.209$, D/f = 0.1465,
$n_1 - n_2 = 0.31658$

| | | | |
|---|---|---|---|
| $r_1 = \infty$ (stop) | | | |
| | $d_1 = 5.3000$ | | |
| $r_2 = 8.1121$ | | | |
| | $d_2 = 2.4000$ | $n_1 = 1.83481$ | $v_1 = 42.72$ |
| $r_3 = -35.8827$ | | | |
| | $d_3 = 0.8000$ | $n_2 = 1.51823$ | $v_2 = 58.96$ |
| $r_4 = 6.7529$ | | | |
| | $d_4 = 3.5158$ | | |
| $r_5 = -6.6602$ | | | |
| | $d_5 = 0.8000$ | $n_3 = 1.84666$ | $v_3 = 23.78$ |
| $r_6 = 9.9736$ | | | |
| | $d_6 = 4.5000$ | $n_4 = 1.51454$ | $v_4 = 54.69$ |
| $r_7 = -8.6830$ | | | |
| | $d_7 = 0.1500$ | | |
| $r_8 = 19.4410$ | | | |
| | $d_8 = 2.8000$ | $n_5 = 1.68893$ | $v_5 = 31.08$ |
| $r_9 = -28.3164$ | | | |
| | $d_9 = 2.0000$ | | |
| $r_{10} = \infty$ | | | |
| | $d_{10} = 0.7700$ | $n_6 = 1.54771$ | $v_6 = 62.83$ |
| $r_{11} = \infty$ | | | |
| | $d_{11} = 2.1000$ | $n_7 = 1.52420$ | $v_7 = 70.20$ |
| $r_{12} = \infty$ | | | |
| | $d_{12} = 1.8600$ | $n_8 = 1.54771$ | $v_8 = 62.83$ |
| $r_{13} = \infty$ | | | |
| | $d_{13} = 2.0000$ | $n_9 = 1.54771$ | $v_9 = 62.83$ |
| $r_{14} = \infty$ | | | |
| | $d_{14} = 8.0000$ | $n_{10} = 1.51633$ | $v_{10} = 64.15$ |
| $r_{15} = \infty$ | | | |
| | $d_{15} = 5.0000$ | | |
| $r_{16} = \infty$ | | | |
| | $d_{16} = 0.7500$ | $n_{11} = 1.48749$ | $v_{11} = 70.20$ |
| $r_{17} = \infty$ | | | |

Figure 8:
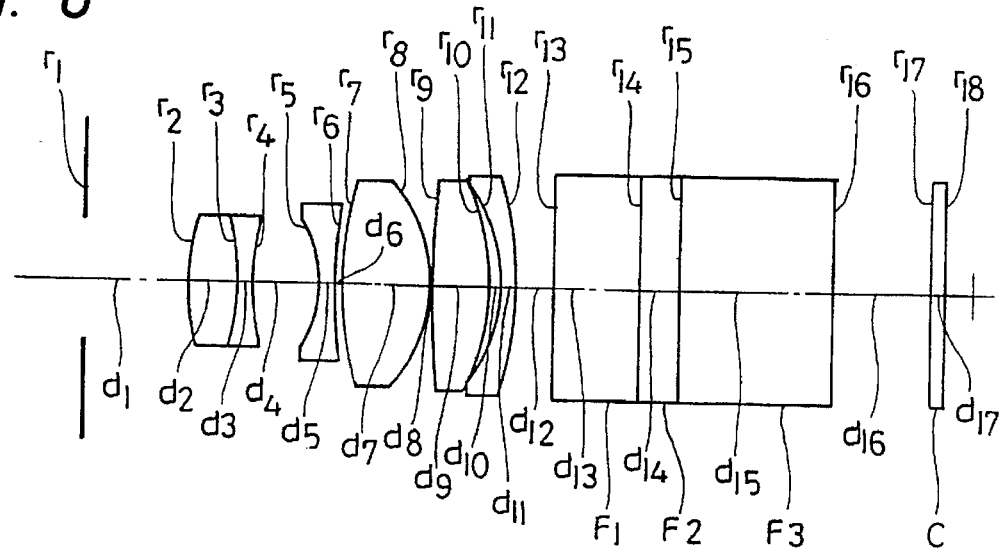
FIG. 8 shows a sectional view illustrating a composition of a fifth embodiment of the imaging lens system used in the optical system according to the present invention.
Figure 9:
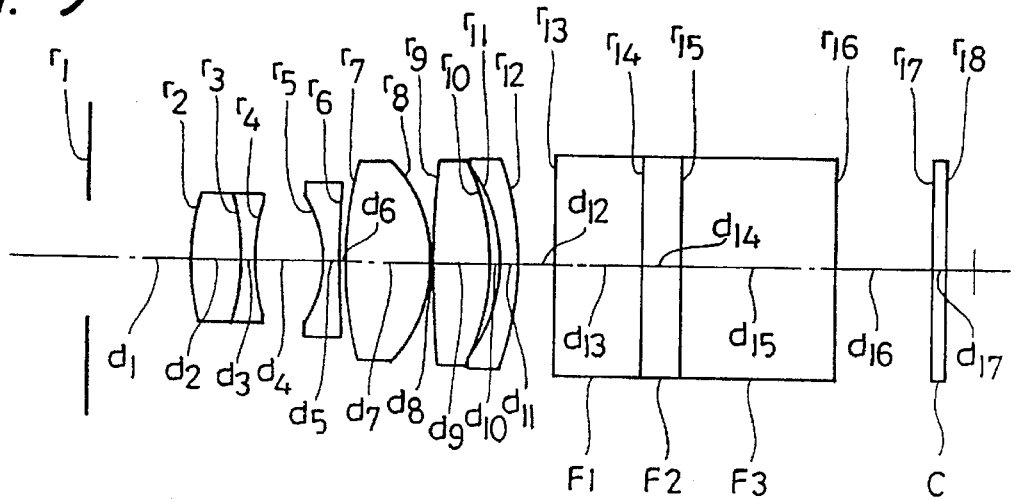
FIG. 9 shows a sectional view illustrating a composition of a sixth embodiment of the imaging lens system used in the optical system according to the present invention.
Figure 10:
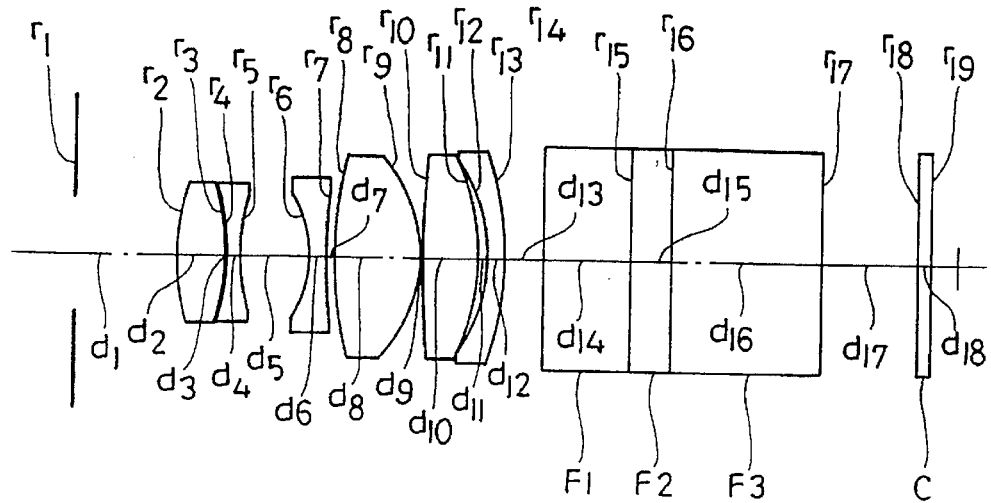
FIG. 10 shows a sectional view illustrating a composition of a seventh embodiment of the imaging lens system used in the optical system according to the present invention.
Figures 16A, 16B, 16C, 16D, 16E:
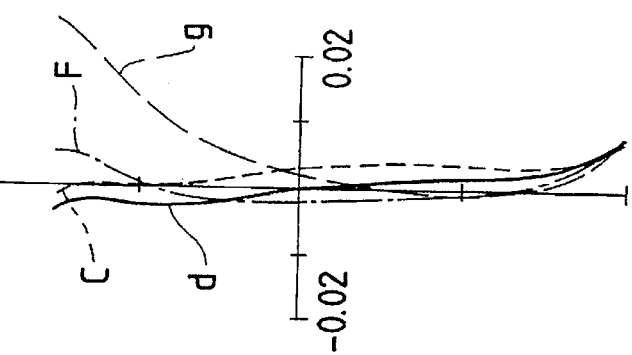
FIG. 16A, FIG. 16B, FIG. 16C, FIG. 16D and FIG. 16E show curves visualizing aberration characteristics of the sixth embodiment of the imaging lens system used in the optical system according to the present invention.

A fifth embodiment, a sixth embodiment and a seventh embodiment of the imaging lens system to be used in the optical system according to the present invention have compositions which are illustrated in FIG. 8, FIG. 9 and FIG. 10 respectively, in each of which an imaging lens system consists of a front lens unit and a rear lens unit in order from an aperture stop disposed in front of the lens system, and is characterized in that the rear lens unit is composed, in order from the object side, of a first negative lens element which has high curvature on an object side surface thereof, a second positive lens element which has high curvature on an image side surface thereof, a third lens element which has high curvature on an image side surface thereof and a fourth negative meniscus lens element which has a strongly concave surface on the object side for nearly zeroing distortion without aggravation coma and astigmatism.

Further, the fifth embodiment, the sixth embodiment and the seventh embodiment are configured so as to satisfy the above-mentioned conditions (5) and (6).

If the lower limit of 0.6 of the condition (5) is exceeded, it will be impossible to completely correct barrel distortion. If the upper limit of 1.0 of the condition (5) is exceeded, coma of high orders and astigmatism will tend to be produced.

If the lower limit of 0.12 of the condition (6) is exceeded, it will be impossible to correct coma and astigmatism while completely eliminating distortion. If the upper limit of 0.25 of the condition (6) is exceeded, it will be impossible to reserve a long back focal length for the imaging lens system.

The fifth embodiment, the sixth embodiment and the seventh embodiment also satisfy the above-mentioned conditions (7), (8), (9) and (10).

The conditions (7), (8), (9) and (10) define shape factors for the first lens element, the second lens element, the third lens element and the fourth lens element respectively of the rear lens unit.

If the upper limit of −0.4 of the condition (7), the upper limit of 0 of the condition (8), the lower limit of 0.25 of the condition (9) or the lower limit of 0.4 of the condition (10) is exceeded, it will be difficult to completely eliminate distortion while reserving a long back focal length for the imaging lens system, and further correct coma and astigmatism.

If the lower limit of −1.3 of the condition (7), the lower limit of −5.0 of the condition (8), the upper limit of 1.2 of the condition (9) or the upper limit of 1.2 of the condition (10) is exceeded, in contrast, aberrations of high orders will be produced.

In each of the fifth embodiment, the sixth embodiment and the seventh embodiment, the second lens element, the third lens element and the fourth lens element used in the rear lens unit are configured so as to satisfy the conditions (11), (12) and (13) respectively.

If the upper limit of 1.70 of the condition (11), the upper limit of 1.70 of the condition (12) or the lower limit of 1.70 of the condition (13) is exceeded, it will be difficult to correct coma and astigmatism more favorably. If the lower limit of 1.45 of the condition (11), the lower limit of 1.45 of the condition (12) or the upper limit of 1.95 of the condition (13) is exceeded, in contrast, it will be difficult to correct a Petzval's sum and offaxial aberrations will be aggravated.

Each of the fifth embodiment, the sixth embodiment and the seventh embodiment satisfies the conditions (5) through (13) and corrects astigmatism almost completely. The fifth embodiment, the sixth embodiment and the seventh embodiment further satisfy the condition (15) and the condition (16), thereby correcting coma almost completely and having optical performance favored as a whole by correcting spherical aberration, curvature of field and chromatic aberration. That is to say, these embodiments satisfy the condition (15) which defines a difference between a refractive index of the first lens element and a refractive index of the second lens element disposed in the front lens unit, thereby correcting spherical aberration, longitudinal chromatic aberration and Petzval's sum which cannot be corrected sufficiently by the rear lens unit. If the lower limit of 0.05 of the condition (15) is exceeded, it will be difficult to correct spherical aberration, longitudinal chromatic aberration and Petzval's sum. If the upper limit of 0.35 of the condition (15) is exceeded, it will be difficult in practice to obtain a suitable glass material.

The condition (16) defines a ratio between Abbe's numbers of the first lens element and the second lens element disposed in the front lens unit, and serves for correcting mainly longitudinal chromatic aberration. If the lower limit of −1.0 of the condition (16) is exceeded, longitudinal chromatic aberration will be undercorrected. If the upper limit of 2.5 of the condition (16) is exceeded, longitudinal chromatic aberration will be overcorrected.

Furthermore, each of the fifth embodiment, the sixth embodiment and the seventh embodiment selects, for an image side surface of the first lens element and an object side surface of the second lens element disposed in the front lens unit, radii of curvature satisfying the condition (1b), thereby correcting spherical aberration more favorably.

If the lower limit of 0.9 of the condition (1b) is exceeded, the imaging lens system will have no function to correct spherical aberration which is apt to be overcorrected by the rear lens unit. If the upper limit of 1.6 of the condition (17) is exceeded, in contrast, spherical aberration will tend to be undercorrected.

The fifth embodiment, the sixth embodiment and the seventh embodiment have the numerical data which are listed below:

EMBODIMENT 5

$f = 24$ mm, F/4, IH = 5.4

| | | | |
|---|---|---|---|
| $r_1 = \infty$ (stop) | $d_1 = 5.3000$ | | |
| $r_2 = 11.7378$ | $d_2 = 2.6000$ | $n_1 = 1.78800$ | $v_1 = 47.38$ |
| $r_3 = -11.7378$ | $d_3 = 0.8000$ | $n_2 = 1.53256$ | $v_2 = 45.91$ |
| $r_4 = 11.7378$ | $d_4 = 3.5309$ | | |
| $r_5 = -5.7656$ | $d_5 = 0.8000$ | $n_3 = 1.83400$ | $v_3 = 37.16$ |
| $r_6 = 34.3011$ | $d_6 = 0.3868$ | | |
| $r_7 = 19.9609$ | $d_7 = 4.6000$ | $n_4 = 1.60311$ | $v_4 = 60.70$ |
| $r_8 = -7.7218$ | $d_8 = 0.1500$ | | |
| $r_9 = 66.9671$ | $d_9 = 3.0000$ | $n_5 = 1.67003$ | $v_5 = 47.25$ |
| $r_{10} = -11.0553$ | $d_{10} = 0.5000$ | | |
| $r_{11} = -8.4014$ | $d_{11} = 0.9000$ | $n_6 = 1.83400$ | $v_6 = 37.16$ |
| $r_{12} = -16.4782$ | $d_{12} = 2.0000$ | | |
| $r_{13} = \infty$ | $d_{13} = 4.6300$ | $n_7 = 1.54771$ | $v_7 = 62.83$ |
| $r_{14} = \infty$ | $d_{14} = 2.1000$ | $n_8 = 1.52420$ | $v_8 = 70.20$ |
| $r_{15} = \infty$ | $d_{15} = 8.0000$ | $n_9 = 1.51633$ | $v_9 = 64.15$ |
| $r_{16} = \infty$ | $d_{16} = 5.0000$ | | |
| $r_{17} = \infty$ | $d_{17} = 0.7500$ | $n_{10} = 1.48749$ | $v_{10} = 70.20$ |
| $r_{18} = \infty$ | | | |

$R_{41}/R_{32} = r_{11}/r_{10} = 0.7599$, D/f = 0.1471
$(R_{11} + R_{12})/(R_{11} - R_{12}) = (r_5 - r_6)/(r_5 + r_6) = -0.7122$
$(R_{21} + R_{22})/(R_{21} - R_{22}) = (r_8 - r_8)/(r_7 + r_8) = 0.4421$
$(R_{31} + R_{32})/(R_{31} - R_{32}) = (r_9 - r_{10})/(r_9 + r_{10}) = 0.7166$
$(R_{41} + R_{42})/(R_{41} - R_{42}) = (r_{11} - r_{12})/(r_{11} + r_{12}) = -3.0804$
$N_{R2} = n_4 = 1.60311$, $N_{R3} = n_5 = 1.67003$,
$N_{R4} = n_6 = 1.83400$, $N_{F1} - N_{F2} = n_1 - n_2 = 0.25544$,
$v_{F1} - v_{F2} = v_1 - v_2 = 1.47$, $R_{F21}/R_{F12} = r_4/r_3 = 1.0$

EMBODIMENT 6 f = 24 mm, F/4, IH = 5.4

| | | | |
|---|---|---|---|
| $r_1 = \infty$ (stop) | | | |
| | $d_1 = 5.3000$ | | |
| $r_2 = 11.6823$ | | | |
| | $d_2 = 2.6000$ | $n_1 = 1.78800$ | $v_1 = 47.38$ |
| $r_3 = -11.6823$ | | | |
| | $d_3 = 0.8000$ | $n_2 = 1.53256$ | $v_2 = 45.91$ |
| $r_4 = 11.6823$ | | | |
| | $d_4 = 3.5549$ | | |
| $r_5 = -5.7029$ | | | |
| | $d_5 = 0.8000$ | $n_3 = 1.83400$ | $v_3 = 37.16$ |
| $r_6 = 33.6828$ | | | |
| | $d_6 = 0.3567$ | | |
| $r_7 = 20.3321$ | | | |
| | $d_7 = 4.5000$ | $n_4 = 1.60311$ | $v_4 = 60.70$ |
| $r_8 = -7.5940$ | | | |
| | $d_8 = 0.1500$ | | |
| $r_9 = 66.2901$ | | | |
| | $d_9 = 3.0000$ | $n_5 = 1.67270$ | $v_5 = 32.10$ |
| $r_{10} = -10.8699$ | | | |
| | $d_{10} = 0.4600$ | | |
| $r_{11} = -8.4215$ | | | |
| | $d_{11} = 0.9000$ | $n_6 = 1.84666$ | $v_6 = 23.78$ |
| $r_{12} = -16.5513$ | | | |
| | $d_{12} = 2.0000$ | | |
| $r_{13} = \infty$ | | | |
| | $d_{13} = 4.6300$ | $n_7 = 1.54771$ | $v_7 = 62.83$ |
| $r_{14} = \infty$ | | | |
| | $d_{14} = 2.1000$ | $n_8 = 1.52420$ | $v_8 = 70.20$ |
| $r_{15} = \infty$ | | | |
| | $d_{15} = 8.0000$ | $n_9 = 1.51633$ | $v_9 = 64.15$ |
| $r_{16} = \infty$ | | | |
| | $d_{16} = 5.0000$ | | |
| $r_{17} = \infty$ | | | |
| | $d_{17} = 0.7500$ | $n_{10} = 1.48749$ | $v_{10} = 70.20$ |
| $r_{18} = \infty$ | | | |

$R_{41}/R_{32} = r_{11}/r_{10} = 0.7748$, $D/f = 0.1481$
$(R_{11} + R_{12})/(R_{11} - R_{12}) = (r_5 - r_6)/(r_5 + r_6) = -0.7104$
$(R_{21} + R_{22})/(R_{21} - R_{22}) = (r_8 - r_8)/(r_7 + r_8) = 0.4421$
$(R_{31} + R_{32})/(R_{31} - R_{32}) = (r_9 - r_{10})/(r_9 + r_{10}) = 0.7166$
$(R_{41} + R_{42})/(R_{41} - R_{42}) = (r_{11} - r_{12})/(r_{11} + r_{12}) = -3.0718$
$N_{R2} = n_4 = 1.60311$, $N_{R3} = m_5 = 1.67270$,
$N_{R4} = n_6 = 1.84666$, $N_{F1} - N_{F2} = n_1 - n_2 = 0.25544$,
$v_{F1} - v_{F2} = v_1 - v_2 = 1.47$, $R_{F21}/R_{F12} = r_4/r_3 = 1.0$

EMBODIMENT 7 f = 24 mm, F/4, IH = 5.4

| | | | |
|---|---|---|---|
| $r_1 = \infty$ (stop) | | | |
| | $d_1 = 5.3000$ | | |
| $r_2 = 12.2339$ | | | |
| | $d_2 = 2.5000$ | $n_1 = 1.80400$ | $v_1 = 46.57$ |
| $r_3 = -12.2339$ | | | |
| | $d_3 = 0.0100$ | | |
| $r_4 = -12.0048$ | | | |
| | $d_4 = 0.8000$ | $n_2 = 1.53256$ | $v_2 = 45.91$ |
| $r_5 = 12.0048$ | | | |
| | $d_5 = 3.6474$ | | |
| $r_6 = -5.9380$ | | | |
| | $d_6 = 0.8000$ | $n_3 = 1.80100$ | $v_3 = 34.97$ |
| $r_7 = 29.7515$ | | | |
| | $d_7 = 0.4688$ | | |
| $r_8 = 20.3173$ | | | |
| | $d_8 = 4.5000$ | $n_4 = 1.60311$ | $v_4 = 60.70$ |
| $r_9 = -7.7736$ | | | |
| | $d_9 = 0.1500$ | | |
| $r_{10} = 83.4852$ | | | |
| | $d_{10} = 2.9000$ | $n_5 = 1.67003$ | $v_5 = 47.25$ |
| $r_{11} = -11.0129$ | | | |
| | $d_{11} = 0.4600$ | | |
| $r_{12} = -8.5224$ | | | |
| | $d_{12} = 0.9000$ | $n_6 = 1.88300$ | $v_6 = 40.78$ |

-continued f = 24 mm, F/4, IH = 5.4

| | | | |
|---|---|---|---|
| $r_{13} = -16.2604$ | | | |
| | $d_{13} = 2.0000$ | | |
| $r_{14} = \infty$ | | | |
| | $d_{14} = 4.6300$ | $n_7 = 1.54771$ | $v_7 = 62.83$ |
| $r_{15} = \infty$ | | | |
| | $d_{15} = 2.1000$ | $n_8 = 1.52420$ | $v_8 = 70.20$ |
| $r_{16} = \infty$ | | | |
| | $d_{16} = 8.0000$ | $n_9 = 1.51633$ | $v_9 = 64.15$ |
| $r_{17} = \infty$ | | | |
| | $d_{17} = 5.0000$ | | |
| $r_{18} = \infty$ | | | |
| | $d_{18} = 0.7500$ | $n_{10} = 1.48749$ | $v_{10} = 70.20$ |
| $r_{19} = \infty$ | | | |

$R_{41}/R_{32} = r_{11}/r_{10} = 0.7739$, $D/f = 0.1520$
$(R_{11} + R_{12})/(R_{11} - R_{12}) = (r_5 + r_6)/(r_5 - r_6) = -0.6672$
$(R_{21} + R_{22})/(R_{21} - R_{22}) = (r_8 + r_8)/(r_7 - r_8) = 0.4465$
$(R_{31} + R_{32})/(R_{31} - R_{32}) = (r_9 + r_{10})/(r_9 - r_{10}) = 0.7669$
$(R_{41} + R_{42})/(R_{41} - R_{42}) = (r_{11} + r_{12})/(r_{11} - r_{12}) = -3.2027$
$N_{R2} = n_4 = 1.60311$, $N_{R3} = n_5 = 1.67003$,
$N_{R4} = n_6 = 1.88300$, $N_{F1} - N_{F2} = n_1 - n_2 = 0.27144$,
$v_{F1} - v_{F2} = v_1 - v_2 = 0.66$, $R_{F21}/R_{F12} = r_4/r_3 = 0.9813$ wherein the reference symbols $r_1, r_2, \ldots$ represent radii of curvature on surfaces of respective lens elements, the reference symbols $d_1, d_2, \ldots$ designate thicknesses of the respective lens elements and air-spaces reserved therebetween, the reference symbols $n_1, n_2, \ldots$ denote refractive indices of the respective lens elements, and the reference symbols $v_1, v_2, \ldots$ represent Abbe's numbers of the respective lens elements.

The optical system according to the present invention is a compact optical system which can be manufactured at a low cost and provide a fine image as highly as ones obtainable with silver salt cameras with picture elements in a number substantially larger than those used on image sensors in compliance with the HDTV standard even by using image pickup devices which are as low in price as the conventional CCD image sensors, and has a small number of CCD's and narrow effective image pickup areas. Accordingly, the optical system according to the present invention permits easily picking up images of fine characters and patterns which cannot be picked up by the conventional simple electronic image pickup apparatus and composing image input devices for data processing systems featuring high operability. Further, the imaging lens system used in the optical system according to the present invention comprises an aperture stop disposed on the object side of the lens system, is suited for use with electronic image pickup apparatus having a scanning function with a rotating mirror, has a long back focal length long enough for reserving a space to dispose optical elements such as optical low pass filters therein, and has distortion corrected extremely favorably.

I claim:

1. An optical system for an electronic image pickup apparatus, said optical system comprising, in order from an object side:

only one rotating mirror for deflecting rays coming from an object;

an aperture stop;

an imaging lens system which forms an image of said object while receiving rays coming from said rotating mirror, said imaging lens system comprising a plurality of lens elements movable along an optical axis thereof; and a plurality of electronic image sensors for receiving rays coming from said imaging lens system.

2. An optical system for an electronic image pickup apparatus according to claim 1, wherein said optical system further comprises:

light dividing means, disposed between said imaging lens system and said plurality of electronic image sensors, for branching in a plurality of directions rays coming from said imaging lens system;

each of said plurality of electronic image sensors being disposed in an optical path for receiving said branched rays.

3. An optical system for an electronic image pickup apparatus according to claim 1, wherein:

said electronic image sensors are disposed so that longer sides of image pickup surfaces thereof are perpendicular to a plane including a direction of rotation of said rotating mirror; and light dividing means for deflecting rays so as to be in parallel with the plane including the direction of rotation of said rotating mirror.

4. An optical system for an electronic image pickup apparatus comprising, in order from an object side:

a rotating mirror for deflecting rays coming from an object;

an aperture stop;

an imaging lens system which forms an image of said object while receiving rays coming from said rotating mirror, said imaging lens system comprising a plurality of lens elements movable along an optical axis thereof;

an optical low pass filter;

light dividing means for braching in a plurality of directions rays coming from said imaging lens system; and a plurality of electronic image sensors for receiving said branched rays coming from said light dividing means.

5. An optical system for an electronic image pickup apparatus according to claim 4, wherein:

said plurality of electronic image sensors are disposed so that longer sides of image pickup surfaces thereof are perpendicular to a plane including a direction of rotation of said rotating mirror; and said light dividing means deflects rays to be in parallel with said plane including said direction of rotation of said rotating mirror.

6. An optical system for an electronic image pickup apparatus according to claim 4, wherein:

a plurality of optical low pass filters are disposed between said imaging lens system and said light dividing means.

7. An optical system for an electronic image pickup apparatus according to claim 6, wherein:

an azimuth of an orthophotographic image of a crystallographic axis of one of said plurality of optical low pass filters which is disposed on a side of said light dividing means facing said imaging lens system is at an angle of approximately 45° relative to said plane including a direction of rotation of said rotating mirror.

* * * * *